Nov. 15, 1927.
H. S. JANDUS
CLAMPING DEVICE FOR BUMPERS AND LIKE ARTICLES
Filed Feb. 18, 1926
1,649,165
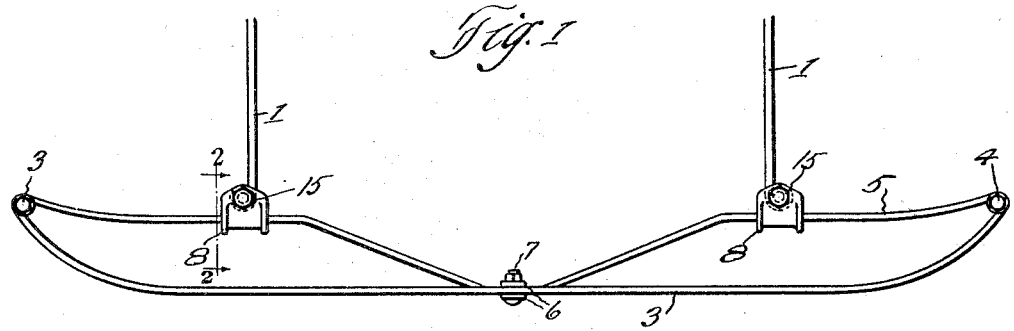
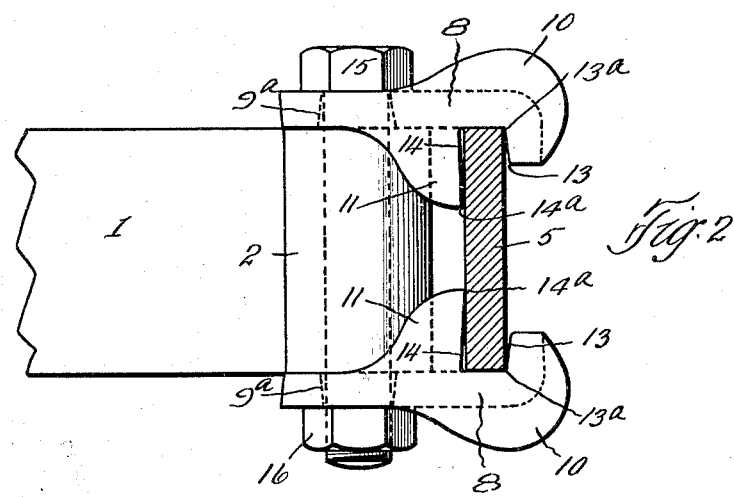
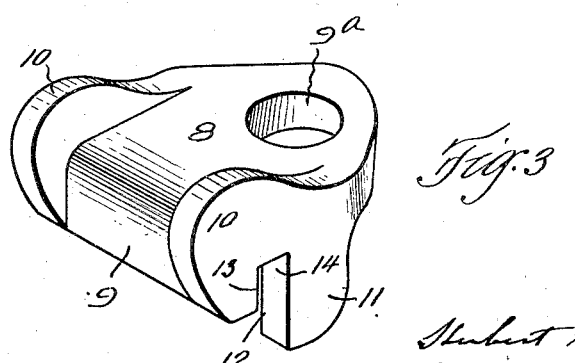
INVENTOR Patented Nov. 15, 1927.

1,649,165

UNITED STATES PATENT OFFICE.

HERBERT S. JANDUS, OF DETROIT, MICHIGAN, ASSIGNOR TO THE C. G. SPRING & BUMPER COMPANY, OF DETROIT, MICHIGAN, A CORPORATION OF DELAWARE.

CLAMPING DEVICE FOR BUMPERS AND LIKE ARTICLES.

Application filed February 18, 1926. Serial No. 89,005.

This invention relates to devices for securing bars of bumpers to their supporting arms, and has for its general object to provide a device of this character which will enable the said bars to be clamped quickly and securely in place; which will enable this result to be accomplished without the necessity for any bolt additional to that employed for securing the clamping devices to the said arms. A further object of the invention is to provide a device of this character which will form a secure and non-rattling engagement between such device and the bumper bar to which it is applied. A still further object of the invention is to provide a device which will enable the foregoing results to be accomplished by means of a structure which is simple and economical of production.

In the drawings forming part hereof, Fig. 1 represents a plan view of a bumper, showing the attaching arms and the manner in which my clamping devices are employed for securing the bumper to said arms; Fig. 2 is an enlarged detail in section corresponding to the line 2—2 of Fig. 1; and Fig. 3 is a perspective view of one of the members of a clamping device.

Describing the parts herein by reference characters, 1 denotes a pair of supporting arms such as are employed to secure a bumper to the side members of an automobile frame (not shown). Each of the arms is provided at its front or outer end with an eye 2. For convenience of description, the arms 1 will be assumed to be secured to the front ends of the frame members, and the terms "front" and "rear" will be employed hereinafter in accordance with such assumption, but without limiting the use of my invention to a particular end of the automobile or other vehicle.

The arms 1 support at their front or outer ends a bumper which is shown herein as consisting of one or more front or impact bars 3 connected at their ends by bolts 4 with a rear or auxiliary bar 5. The central portion of the rear bar is shown as projected toward and preferably between the front bars 3, being secured thereto by clamping plates 6 and a bolt 7. It will be understood that the bumper may be of any approved construction, the one shown herein being selected for purposes of illustration.

For the purpose of supporting the bumper from the arms 1, I have provided a pair of clamping devices each consisting of an upper and a lower member, the members engaging the bar 5 and being themselves secured to the eyes 2.

The members of each clamping device are identical in construction and may be used interchangeably. For convenience of description, one of the upper members will be described. This member comprises a body 8 having an aperture $9^a$ through the rear portion thereof. The under surface of the body 8 is adapted to bear upon the top of an eye 2 and to support the said member upon said eye with the body extending outwardly or forwardly in substantially the plane of the top of said eye. The front of the body 8 is bent downwardly to form a depending flange 9, and each side of the body is provided with a strengthening rib 10, the outer side of which preferably forms part of one of the sides 11 of the member. Each side 11 is provided with a slot 12, the front wall 13 of which is shown as considerably shorter than the rear wall 14. Furthermore, as will appear from Fig. 2, the sides 13 and 14 of the slot are not exactly at right angles to the bottom of the body portion 8, but are inclined downwardly and forwardly from the plane of such bottom. It will be noted further that the aperture $9^a$ is of gradually increasing diameter from the top to the bottom thereof, as indicated in Fig. 2, the top of the aperture substantially sizing the bolt 15.

With this construction and arrangement of parts, it will be apparent that when a pair of clamping members such as described are applied, the one to the top of an eye 2 and the other to the bottom of such eye, with their flanges 9 presented toward each other and the upper and lower edges of the bar 5 entered in the slots 12—by inserting the pivot clamping bolt 15 through the apertures $9^a$ and setting up on the nut 16, the bar will be clamped firmly by the said members; the width of the slots 12 being such that, when the nut is thus set up, there will be a tendency to spring the top and bottom edges of the bar 5 toward the eye 2. This tendency is due to the fact that the bottom edge $14^a$ of the wall 14 of the upper member and the corresponding upper edge $14^a$ of the bottom member will thrust forwardly or outwardly against the adjacent inner or rear face of the bar 5 while the top and bottom edges of the opposite face of the bar are held by their engagement with the top 13ᵃ of the wall 13 of the upper member and the bottom 13ᵃ of the like wall 13 of the lower member.

The shape of the apertures 9ᵃ enables the bolt 15 to be inserted through the upper and lower clamping members with the bar 5 received within the slots 12, the clamping members being capable of tilting upon the bolt so as to receive said bar and the said bolt, after which the nut 16 may be set up, clamping the bar in the manner shown in Fig. 2. When the nut is so set up, the bar 5 will be clamped at eight lines of contact for each clamping device—at two upper lines of contact 14ᵃ on the rear or inner face thereof, at two upper lines of contact at 13ᵃ at the upper front edge thereof, at two lower lines of contact 14ᵃ at the rear or inner face thereof, and at two lower lines of contact 13ᵃ at the bottom and front or outer edge thereof. Furthermore, the bar will be clamped by each pair of clamping devices in a manner which tends to spring the top and bottom of the bar rearwardly or inwardly toward the eye 2. This results in a very secure and non-rattling connection between the bumper and the arms 1; and this result is accomplished by the use of a single bolt for each pair of clamping members.

For convenience of description, the clamping members have been referred to herein as "upper" and "lower" members, and the parts thereof have been described with reference to the use of such members with a vertically-arranged eye. By such description, however, I do not propose to limit the use of my invention to use with an eye extending in any particular direction.

Having thus described my invention, what I claim is:—

1. The combination, with a bumper-supporting arm having an eye, of a bumper bar, a pair of bumper-clamping members each having a slot at an acute angle to the plane of said bar and adapted to receive an edge of said bar, and a bolt securing the said members respectively to opposite faces or sides of said eye.

2. The combination, with a bumper-supporting arm having an eye, of a bumper bar, a pair of bumper-clamping members each having a slot adapted to receive an edge of said bar, the inner wall of each slot extending beyond the outer wall and adapted and arranged to engage with its end the inner face of the bar, and a bolt securing the said members to the said eye.

3. The combination, with a bumper-supporting arm having an eye, of a bumper bar, a pair of bumper clamping members each having a slot adapted to receive an edge of said bar, one wall of each slot extending beyond the other wall and at an angle to a face of said bar and adapted and arranged to engage with its end the said face of the bar and a bolt securing the said members to the said eye.

4. The combination, with a bumper-supporting arm having an eye, of a bumper bar, a pair of bumper-clamping members each having a slot adapted to receive an edge of said bar, the walls of each slot forming a slightly acute angle with the plane of the portion of the bottom of each member which extends from such slot toward the said eye and the inner wall of each slot being longer than the outer wall whereby the inner end of such wall may engage the inner face of the bumper bar in a line remote from the edge thereof, and means securing the said members to the said eye.

5. The combination, with a bumper-supporting arm having an eye, of a bumper bar, a pair of bumper-clamping members each having a slot adapted to receive an edge of said bar, the walls of each slot forming a slightly acute angle with the plane of the portion of the bottom of each member which extends from such slot toward the said eye and one of the walls of each slot being longer than the other wall whereby the end of such longer wall may engage the face of the bumper bar in a line remote from the edge thereof, and a bolt for securing the said members to the said eye.

6. The combination, with a bumper-supporting arm having an eye, of a bumper bar, a pair of bumper-clamping members each having a body portion adapted to be secured against an end of said eye, each of said members having sides each provided with a slot, each slot forming a slightly acute angle with the plane of said member extending therefrom toward said eye, and one of the walls of each slot being longer than the other wall whereby, when the said members are clamped to said eye, the ends of the longer walls of said slots will exert a pressure against the adjacent face of said bar, and a bolt extending through the said members and the said eye and securing the members thereto.

7. The combination, with a bumper-supporting member having an eye, of a bumper bar, a pair of bumper-clamping members adapted to be secured, the one to one face of said eye and the other to the other face of said eye, said members being symmetrical and each having a slot adapted to receive an edge of said bar, the said slots being arranged to provide each a pair of vertically spaced contacts with opposite faces of said bar, and a bolt for securing said members to said eye.

8. The combination, with a bumper-supporting arm having an eye, of a bumper bar, a pair of clamping members adapted to be secured the one to one face of said eye and the other to the other face of said eye and each having in front of said eye a vertically extending slot, the slots being arranged each to engage the outer edge of the said bar and the inner face of said bar in a line spaced vertically from such edge, and a bolt extending through the said eye and the said members.

9. The combination, with a bumper supporting arm having an eye, of a bumper bar, a pair of clamping members adapted to be secured the one to one end of said eye and the other to the other end of said eye and each having in front of said eye a vertically extending slot, the slots being arranged each to engage the outer edge of the said bar and the inner face of said bar in a line spaced vertically from such edge, each clamping member having an aperture through the inner or rear portion thereof, each aperture being of progressively increasing diameter from the outer face thereof toward the inner face thereof, a bolt substantially sizing the contracted portion of the bore of each member and extending through said eye, and a nut on said bolt.

10. The combination, with a bumper-supporting arm having an eye, of a bumper bar, a pair of clamping members adapted to be secured the one to one end of said eye and the other to the other end of said eye and each having in front of said eye a vertically extending slot, the slots being arranged each to engage the one edge of the said bar and the opposite face of said bar in a line spaced vertically from such edge, each clamping member having an aperture through the inner or rear portion thereof, each aperture being of progressively increasing diameter from the outer face thereof toward the inner face thereof, and a bolt substantially sizing the contracted portion of the bore of each member and securing the same to said eye.

11. The combination, with a bumper-supporting arm, of a bumper bar, a pair of clamping members adapted to be pivotally secured the one to the top of said arm and the other to the bottom of said arm, each of said clamping members having a substantially vertically extending slot adapted to receive an edge of, and having its edges inclined to the plane of the said bar, and means for securing the said members to the top and bottom of the said bar, respectively.

12. The combination, with a bumper-supporting arm, of a bumper bar, a pair of clamping members adapted to be secured to the top and the bottom of said arm respectively, each of said members having a vertically extending slot in front of said arm, the slots being arranged each to engage the outer edge of the said bar and the inner face of said bar in a line spaced vertically from such edge, and means for securing the said members to the top and the bottom of said bar respectively.

13. A bumper bar clamp consisting of two members each having a slot therein with an inclined surface adapted to bear upon a face of a bar at a point spaced from the edge thereof and means for drawing the members toward each other.

14. A bumper bar clamp consisting of two members each having an inclined surface adapted to bear upon a face of a bar at a point spaced from the edge thereof and an inclined surface adapted to bear upon the other face of the said bar at a point closer to the edge of said bar, and means for drawing the two members together.

15. A bumper bar clamp consisting of two members adapted to bear on opposite surfaces of a spacer and means for clamping said members to said spacer, each of said members having surfaces adapted to bear upon opposite faces of a bar adapted to be clamped between them and at points spaced differently from an edge of said bar.

In testimony whereof, I hereunto affix my signature.

HERBERT S. JANDUS.